March 8, 1955
A. PANAGROSSI ET AL
2,703,775
BONDED SILICONE RUBBER PRODUCTS
AND METHOD OF MAKING SAME
Filed Feb. 1, 1952
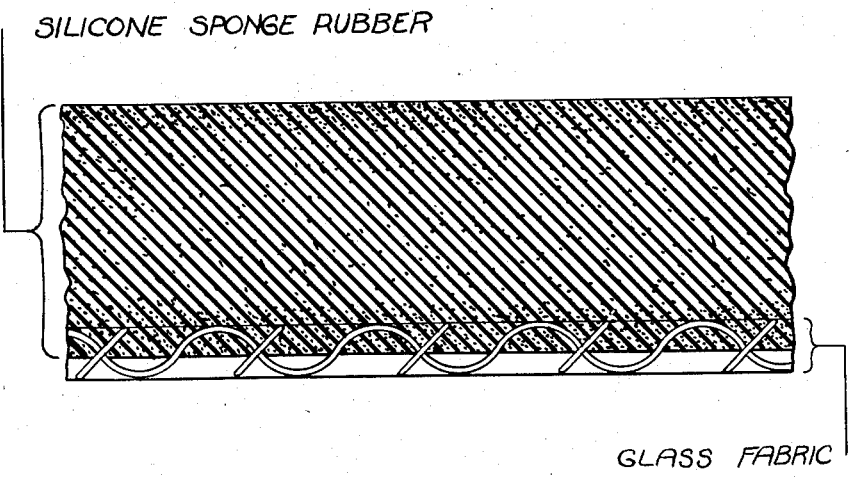
INVENTORS
Ahmed Panagrossi and
Thomas J. Sobol
BY Rockwell-Garchitorena
ATTORNEYS

# United States Patent Office 2,703,775
Patented Mar. 8, 1955

2,703,775

BONDED SILICONE RUBBER PRODUCTS AND METHOD OF MAKING SAME

Ahmed Panagrossi, North Haven, and Thomas J. Sobol, Ansonia, Conn., assignors to The Connecticut Hard Rubber Company, New Haven, Conn., a corporation of Connecticut Application February 1, 1952, Serial No. 269,588

14 Claims. (Cl. 154—128)

This invention relates to the bonding of silicone rubber or silicone rubber sponge to metals or other surfaces, and more particularly to a method for performing such a result which does not involve baking or the application of heat nor the application of any considerable amount of pressure.

Methods which are presently in use for bonding silicone rubber sponge to surfaces of various materials require high temperature ovens and presses for applying heat and pressure simultaneously. Such a process is impractical where the surface to which the rubber is to be attached is large, such for example as the metal surfaces of airplane structures, and for this reason it has been necessary to use various types of mechanical fastening devices. It is not possible, as a practical matter, to apply heat to so large a structure to bring it to the requisite temperature to cure a silicone bond, and it is impossible to apply pressure on such large irregular surfaces to establish a bond between the metal and rubber with known adhesives.

Where surfaces are relatively small and are relatively regular so that heat and pressure could be applied, a satisfactory bond could be made, but it is contemplated by the present invention to provide a means of attaching silicone rubber and silicone rubber sponge to a metal or other surface by a process which may be performed at room temperature and without the application of pressure.

We have discovered that such a bond between a metal surface on the one hand and silicone rubber sponge on the other, for example, can be effected by forming a laminate which is silicone rubber on the one side and glass cloth on the other. In other words, the glass cloth is bonded to the silicone ruber sponge, and this laminate is cemented to the surface which is to be covered with the glass cloth disposed between the rubber sponge and the surface to which it is to be applied. The glass cloth, as applied to the rubber sponge by the present method, can be readily cemented to any practicable surface by known cements.

One object of the present invention is to provide a new and improved method of securing silicone rubber or silicone rubber sponge to a metal or wood surface.

Another object of the invention is to provide a method of securing silicone rubber sponge to a metal or wood surface which method may be carried out at room temperature and without the application of pressure.

A still further object of the invention is to provide a method of securing silicone rubber sponge to various surfaces by employing a layer of glass cloth between the rubber sponge and the surface to be covered, and bonding or securing the cloth to the surface and to the rubber sponge.

A still further object of the invention is to provide a method of securing silicone sponge rubber to a surface of metal or the like, for example, by securing to the undersurface of the rubber sponge a layer of glass cloth, the bond between the glass cloth and the rubber sponge being effected in such a way that the glass cloth may be readily cemented to the metal surface which is to be covered.

To these and other ends the invention consists in the novel features and combinations of parts to be hereinafter described and claimed.

A schematic showing of the laminated product is represented in the drawing.

Heretofore it has not been possible to bond silicone sponge rubber to metal surfaces, for example, without the application of heat and pressure as the types of cements available which would cure at room temperatures were not effective when employed for this purpose. We propose to solve this problem by securing a layer of fiber glass to the silicone rubber, and then securing the fiber glass to the metal surface by cements that will require neither heat nor pressure. However, attempts to form a composite material by laminating silicone rubber or sponge to glass cloth through an intermediate layer of silicone rubber cured onto the cloth have failed to yield satisfactory results. It has been found that when the silicone was cured on the glass cloth under pressure, the silicone rubber sometimes completely impregnates the glass cloth giving a silicone surface on both sides thereof so that no advantage is gained in such event by the use of the glass cloth as neither of the silicone surfaces would be satisfactorily secured to the metal surface. On the other hand, if the silicone, when cured on the glass cloth, fails to wet the cloth, it forms no bond with it and hence the rubber sponge cannot be secured to any surface in this way.

We have, however, found a method of securing the glass cloth to the rubber sponge so as to obtain a firm bond between the two and at the same time maintain the opposite face of the glass cloth in its natural condition so that it may be readily cemented to a metal or other surface. By this method of securing the glass cloth to the rubber sponge we are enabled to effectively secure the sponge to a metal or other surface at room temperature without the application of pressure.

In the lamination of the glass cloth to the rubber sponge the glass cloth is treated with a priming solution and then bonded to the rubber under the pressure generated by the blowing agent in the rubber mix. The dough which forms the rubber mix is first prepared, the glass cloth treated by being dipped into the priming solution and permitted to dry, and the rubber mix is then placed upon the cloth and cured in a suitable mold, as will be hereinafter described.

The rubber mix may be of any desired composition, such compositions being well known in the art, but should include a silicone rubber gum, a reinforcing filler, a curing agent, and a blowing agent. A rubber dough may be made from this mixture as is the custom.

The glass cloth which is to be used is then treated with a primer. We have found that one primer which satisfactorily serves the purpose when correctly employed is one made by the General Electric Company and designated by that company as G. E. Primer No. 81,267. If used without dilution, however, this primer adversely affects the glass cloth and makes it weak and brittle so that it cannot readily be handled or fabricated and is useless for the purpose of laminating. We have found, however, that if used in the form of a solution of 10% to 20% of the primer in carbon tetrachloride, it will give satisfactory results. We, therefore, dip the glass cloth, which is to be used in the laminate, in a 5% to 20% (preferably 10% or more) solution of this primer in carbon tetrachloride and subsequently dry it to remove the solvent before impregnating it with the silicone rubber sponge dough. Hydrocarbon solvents other than carbon tetrachloride may be employed to dilute the primer such, for example, as trichloro ethylene and tetrachloro ethylene among others, or we may also use petroleum ether, petroleum naphtha, petroleum benzene and others of the paraffin series.

After the glass cloth is prepared as above set forth, the rubber dough previously described is sheeted out to about one half the thickness desired. It is then spread upon one surface of the glass cloth, which has been impregnated with the primer and dried as described above, and pressed into the cloth to a slight extent to assist in bonding. The sheet of rubber dough will, of course, be of less thickness than that desired in the finished rubber sponge, usually about one half of the desired thickness.

The glass cloth with its applied layer of silicone sponge rubber dough is then placed in a press between two plates, the plates being separated a distance equal to the desired final thickness of the material so that the rubber dough may expand to this extent. These two plates or sides of the mold may be held apart by shims, and the space between their edges thus closed. The temperature of the mold may be raised to that necessary for curing the rubber, say for example from 300° to 350° F. and left at this temperature for approximately 15 minutes. The sponge may then be removed from the mold and oven cured at a temperature from 350° to 400° F. up to 24 hours.

This process will effect the "blowing" of the sponge rubber to the desired thickness and at the same time will effect a secure bond between the sponge rubber and the glass cloth producing a product which is a firmly bonded laminate of silicone rubber sponge on one side and glass cloth on the other, the latter being so exposed that it can be readily cemented to any ordinary clean surface by use of known air-curing cements or adhesives requiring neither heat nor pressure to cure them to effect a satisfactory bond.

The product of these processing steps resembles in outward appearance what is ordinarily known as jute-backed or "battleship" linoleum. The glass fibers are freely exposed for the attachment of a cement or adhesive but they are at the same time also tightly bonded to the silicone rubber sponge, which forms the remainder of the laminate. The bond between the glass cloth and the silicone sponge possesses a strength approaching that of the sponge itself. The exposed glass fibers are readily cemented to any desired surface by the selection of a cement or adhesive that will bond to the desired surface and to glass fibers. This will ordinarily give the worker a wide choice of cements, since unlike the silicone, glass fibers lend themselves readily to cementing with common cements. Even glues, synthetic and natural resins, rubber cements, silicone adhesives and nitrocellulose cements can be employed depending on the nature of the surface.

The value of this type of laminates lies in the fact that silicone rubber sponge is cold-resistant, heat-insulating, heat-resistant and sound-deadening. In an airplane, for instance, it is frequently necessary to treat walls and bulkheads inside the plane's fuselage for all of these purposes. Heat insulation may be required to maintain a steady temperature inside the plane in spite of wide fluctuations of the outside temperature, but this must be done in such a way as not to increase the fire hazard inside the plane. Similarly, sound must at times be deadened and prevented from passing from one part of the plane to another and this also must be accomplished without materially increasing the fire hazard. Under these circumstances, our laminated glass cloth-sponge silicone product can be used with the greatest satisfaction since it can be applied directly to the walls or bulkheads where effectively insulating against both heat and sound.

The primer which is described above with which the glass cloth is impregnated prior to the bonding of the cloth to the rubber sponge is believed to consist of an unpolymerized chloro-methyl-silane although it is possible some polymerization may have occurred, but in any event is one which can be procured upon the open market. The process of making the rubber dough for either ordinary silicone rubber or silicone rubber sponge is well known in the art and, as has been stated, the exact composition may vary widely without departing from the spirit of the present invention. There are a number of "blowing agents" which may be employed such as those which include carbon dioxide gas, nitrogen gas, ammonia gas, ammonium carbonate, sodium bicarbonate, and others, all of which are more or less soluble in the rubber dough when it is cold, but gasifying when heat is applied. Any of these will give satisfactory results.

While we have described specifically the use of our process with sponge rubber, it will be understood that it may be employed with equal success with ordinary silicone rubber. In that event the glass cloth is treated as before with the same primer solution, allowed to dry, and then the rubber dough is sheeted and applied to the cloth under slight pressure and cured in the usual way. The laminate thus formed is rubber upon one side and glass cloth upon the other, and the latter may be readily cemented to all practical surfaces, at room temperatures and without the application of pressure by many known cements among which are those above described.

As shown in the drawing, the laminate product of the present invention desirably includes a silicone sponge rubber body bound to a glass fabric, the glass fabric being impregnated only part way through the thickness of the glass fabric.

While we have shown and described some preferred embodiments of our invention, it is not to be limited to all of the details shown nor to the exact steps set forth, but may be varied within the spirit of the invention and within the scope of the appended claims.

What we claim is:

1. The method of bonding silicone rubber to a surface of another material which comprises dipping a layer of glass cloth into a suitable priming solution, preparing a rubber dough, spreading a layer of the dough upon one surface of the cloth, curing the rubber under such light pressure that only a portion of the thickness of the cloth is bonded to the rubber, and cementing the rubber-free portion of the cloth to the surface of the other material.

2. The method of bonding silicone rubber to a surface of another material which comprises dipping a layer of glass cloth into a suitable priming solution, preparing a rubber dough, spreading a layer of the dough upon one surface of the cloth, curing the rubber under such light pressure that only a portion of the thickness of the cloth is bonded to the rubber, and then cementing the rubber-free portion of the cloth to the surface of the other material.

3. The method of bonding silicone rubber to a surface of another material which comprises dipping a layer of glass cloth into a priming solution of at least partly unpolymerized chloro-methyl-silane in carbon tetrachloride, preparing the rubber dough, spreading a layer of the dough upon one surface of the cloth, curing under light pressure the rubber thus applied to the cloth, and then cementing the cloth to the surface of the other material.

4. The method of bonding silicone rubber to a surface of another material which comprises dipping a layer of glass cloth into a priming solution consisting of a five to twenty per cent solution of at least partly unpolymerized chloro-methyl-silane in a hydrocarbon solvent, preparing the rubber dough, spreading a layer of the dough upon one surface of the cloth, curing under light pressure the rubber thus applied to the cloth, and then cementing the cloth to the surface of the other material.

5. The method of bonding silicone rubber to a surface of another material which comprises dipping a layer of glass cloth into a priming solution consisting of a five to twenty per cent solution of at least partly unpolymerized chloro-methyl-silane in carbon tetrachloride, preparing the rubber dough, spreading a layer of the dough upon one surface of the cloth, curing under light pressure the rubber thus applied to the cloth, and then cementing the cloth to the surface of the other material.

6. The method of bonding silicone rubber sponge to a surface of another material which comprises preparing a silicone rubber sponge dough containing a blowing agent, impregnating a layer of glass cloth with a chloro-methyl-silane priming solution, spreading the rubber dough upon the treated cloth, curing the rubber thus applied to the cloth under sufficient heat to effect release of gas from the blowing agent while limiting the expansion of the rubber sheet, whereby only a portion of the thickness of the glass cloth is impregnated with rubber, and then cementing the rubber-free cloth surface of the resulting laminate to the surface of the other material.

7. The method of bonding silicone rubber sponge to a surface of another material which comprises preparing a silicone rubber sponge dough containing a blowing agent, impregnating a layer of glass cloth with priming solution containing compounds of hydrogen, carbon, silicon and chlorine, spreading the rubber dough upon the treated cloth, curing the rubber thus applied to only a portion of the thickness of the cloth under sufficient heat to effect release of gas from the blowing agent while limiting the expansion of the rubber sheet under light pressure, and then cementing the rubber-free cloth surface of the resulting laminate to the surface of the other material.

8. The method set forth in claim 6 wherein the priming solution is chloro-methyl-silane.

9. The method set forth in claim 6 wherein the priming solution is at least partly unpolymerized chloro-methyl-silane.

10. The method set forth in claim 6 wherein the priming solution is chloro-methyl-silane in carbon tetrachloride.

11. The method set forth in claim 6 wherein the priming solution is a five to twenty per cent solution of chloro-methyl-silane in carbon tetrachloride.

12. The method of bonding silicone rubber sponge to a surface of another material which comprises preparing a silicone rubber sponge dough containing a blowing agent, impregnating a layer of glass cloth with a chloro-methyl-silane priming solution, spreading the rubber dough upon the treated cloth, placing the glass cloth with the rubber dough thereon between two mold plates spaced apart to permit limited expansion of the rubber, curing the latter to effect release of gas from the blowing agent and under light pressure exerted by the mold plates, and then cementing the cloth surface by the resulting laminate to the surface of the other material.

13. The method of bonding silicone sponge rubber to a surface of another material which comprises preparing a silicone rubber sponge dough containing a blowing agent, impregnating a layer of glass cloth with a ten to twenty per cent solution of an at least partly unpolymerized chloro-methyl-silane in carbon tetrachloride, spreading the rubber dough upon the cloth so treated and pressing the dough into the cloth to a slight extent, placing the cloth with the rubber dough applied thereto between upper and lower spaced-apart mold plates, the spacing of the plates being sufficient to permit limited expansion of the rubber, and curing the latter under sufficient heat to effect release of gas from the blowing agent while the mold plates exert limited pressure on the surfaces of the rubber and cloth laminate, and then cementing the laminate thus formed to the surface of the other material.

14. As an article of manufacture adapted to be cold cemented to another surface, a silicone sponge rubber body having a glass fabric backing, the silicone being impregnated into less than the entire thickness of the glass fabric to form a silicone rubber-fabric bond substantially as strong as the sponge rubber, a substantial portion of the thickness of the glass fabric being rubber-free and having a surface receptive to adhesive cements adapted to secure glass fabrics to other surfaces.

References Cited in the file of this patent

UNITED STATES PATENTS

| | | |
|---|---|---|
| 2,219,054 | Palm et al. | Oct. 22, 1940 |
| 2,392,805 | Biefeld | Jan. 15, 1946 |
| 2,516,030 | Swiss | July 18, 1950 |
| 2,525,070 | Greenwald et al. | Oct. 10, 1950 |
| 2,567,804 | Davies | Sept. 11, 1951 |
| 2,568,672 | Warrick | Sept. 18, 1951 |
| 2,590,493 | Berberich et al. | Mar. 25, 1952 |
| 2,601,337 | Smith-Johannsen | June 24, 1952 |
| 2,642,370 | Parsons et al. | June 16, 1953 |

OTHER REFERENCES

Modern Plastics, "Silicone Resin Bonded Laminates," vol. 23, No. 7, March 1946, pp. 160–162.